(12) United States Patent
Buckingham et al.

(10) Patent No.: US 8,219,246 B2
(45) Date of Patent: Jul. 10, 2012

(54) SYSTEM AND METHOD FOR CONTROLLING A ROBOTIC ARM

(75) Inventors: Robert Oliver Buckingham, Abingdon (GB); Andrew Crispin Graham, Bristol (GB)

(73) Assignee: Oliver Crispin Robotics Limited (GB)

( * ) Notice: Subject to any disclaimer, the term of this patent is extended or adjusted under 35 U.S.C. 154(b) by 628 days.

(21) Appl. No.: 12/400,392

(22) Filed: Mar. 9, 2009

(65) Prior Publication Data

US 2009/0222133 A1    Sep. 3, 2009

Related U.S. Application Data

(63) Continuation-in-part of application No. 10/736,354, filed on Dec. 15, 2003, which is a continuation of application No. PCT/GB02/02649, filed on Jun. 12, 2002.

(30) Foreign Application Priority Data

Jun. 13, 2001   (GB) .................................. 0114406.2

(51) Int. Cl.
*B25J 9/00* (2006.01)
(52) U.S. Cl. ............................................ 700/252; 901/3
(58) Field of Classification Search .................. 700/252, 700/254, 193, 250, 253; 318/568.13, 570, 318/571, 572, 573; 701/23, 25; 901/3; 219/124.1
See application file for complete search history.

(56) References Cited

U.S. PATENT DOCUMENTS

| | | | |
|---|---|---|---|
| 2,761,297 A | 9/1956 | Buchsteiner | |
| 3,266,059 A | 8/1966 | Stelle | |
| 3,274,850 A | 9/1966 | Tascio | |
| 3,275,850 A | 9/1966 | Arseneau | |
| 3,504,902 A | 4/1970 | Irwin | |
| 4,393,728 A | 7/1983 | Larson et al. | |
| 4,403,281 A * | 9/1983 | Holmes et al. | 700/193 |
| 4,440,031 A | 4/1984 | De Fazio | |

(Continued)

FOREIGN PATENT DOCUMENTS

DE    29902753 U1    6/1999

(Continued)

OTHER PUBLICATIONS

International Search Report; PCT/GB2009/001631; Jan. 20, 2010; 6 pages.

(Continued)

*Primary Examiner* — Dalena Tran
(74) *Attorney, Agent, or Firm* — St. Onge Steward Johnston & Reens LLC (57) ABSTRACT

A method of controlling the position of an elongate robotic arm comprising articulated segments. An actuator is associated with each segment to control its position, and a control system operates the actuators. Data representing the position of the arm is gathered and compared to input data that represents a required new position of a part of the arm. Data representing the required new position of the arm is then calculated, attempting to keep the remainder of the arm as close as possible to its previous position. The actuators are operated to move the arm into the new position. In tip following, the data representing the new position may define a path, and the arm may be fitted to the path by matching the position and orientation of a point on each pair of adjacent segments to that of the path.

12 Claims, 7 Drawing Sheets

U.S. PATENT DOCUMENTS

| | | | |
|---|---|---|---|
| 4,494,417 A | | 1/1985 | Larson et al. |
| 4,534,239 A | | 8/1985 | Heimann |
| 4,579,558 A | | 4/1986 | Ramer |
| 4,698,777 A | * | 10/1987 | Toyoda et al. ............... 700/252 |
| 4,751,821 A | | 6/1988 | Birchard |
| 4,784,042 A | | 11/1988 | Paynter |
| 4,815,911 A | | 3/1989 | Bengtsson et al. |
| 4,977,790 A | | 12/1990 | Nishi et al. |
| 5,297,874 A | | 3/1994 | Raines |
| 5,467,003 A | * | 11/1995 | Kosaka et al. ........... 318/568.13 |
| 5,902,050 A | | 5/1999 | Balczun et al. |
| 6,170,990 B1 | | 1/2001 | Hawkins |
| 6,869,396 B2 | | 3/2005 | Belson |
| 2003/0229420 A1 | | 12/2003 | Buckingham et al. |

FOREIGN PATENT DOCUMENTS

| | | |
|---|---|---|
| EP | 0107968 A1 | 5/1984 |
| JP | 59134687 A | 8/1984 |
| JP | 2000167789 A | 6/2000 |
| WO | 0216995 A2 | 2/2002 |
| WO | 2006083306 A2 | 8/2006 |
| WO | 2008068478 A2 | 6/2008 |

OTHER PUBLICATIONS

Conkur; "Path Following Algorithm for Highly Redundant Manipulators"; Robotics and Autonomous Systems, Elsevier Science Publishers; Amsterdam, NL; vol. 45; No. 1; Oct. 31, 2003; 22 pages.

Buckingham, et al.; "Snaking Around in a Nuclear Jungle"; Industrial Robot, MCD Univ Press; vol. 32, No. 2; Jan. 1, 2005; 8 pages.

International Search Report, PCT/GB02/02649, Sep. 25, 2002, 3 Pages.

International Preliminary Examination Report, Sep. 15, 2003, 14 Pages.

* cited by examiner

SYSTEM AND METHOD FOR CONTROLLING A ROBOTIC ARM

CROSS-REFERENCE TO RELATED APPLICATIONS

This application is a continuation-in-part of patent application Ser. No. 10/736,354 filed Dec. 15, 2003, which is a continuation of International Patent Application No. PCT/GB02/02649 filed Jun. 12, 2002, which designates the United States and claims priority of British Application No. 0114406.2 filed Jun. 13, 2001.

FIELD OF THE INVENTION

This invention relates to robotic arms of the type used to reach a remote work site via a convoluted path; for example inside an engine or a human body.

BACKGROUND OF THE INVENTION

A known type of robotic arm is able to follow a path to a work site with the body of the arm remaining on the path. This is known as "tip following". That is, the body of the arm follows the path taken by the tip, in a snake-like manner. The tip may carry a work tool and, for certain tasks, it is necessary for the arm to follow the path precisely and for the tip to be steady and stable.

Examples of mechanisms that are known that can tip-follow include inchworm style devices, flexible telescoping devices such as that shown in WO 2006/083306 (Choset) and snake-arm robots such as shown in WO 0216995 (Buckingham) and U.S. Pat. No. 6,869,396 (Belson). Inchworm style devices advance by segments expanding and contracting along a path. Flexible telescoping devices advance by extending along a path. A variation on the telescoping theme is to have two flexible telescoping mechanisms one inside the other that alternately extend and rigidise, such as that described in Choset.

Snake-arm robots have multiple articulated segments which are independently controlled. For example, the position of the distal end of each segment is controlled using cables. The segments may have multiple links within a segment, such that each segment can adopt a curved shape. This type of device is described in Buckingham.

Known methods for controlling such a device include the use of a basic leader-follower algorithm, in which the shape of each section or segment of the device is copied to the next adjacent section as the arm advances. It will be appreciated that inchworm and telescoping designs also necessarily use such leader-follower algorithms.

The weakness of this approach is that by copying the motion of a more distal segment to a more proximal segment much of the potential motion capability of the proximal segments is lost. This is because the following segments have to be identical to the leader. In comparison, the known method of controlling non-redundant robots is for an input device to be used to define a desired tip "pose" for the device, and for mathematical algorithms based on Jacobian matrices or inverse kinematics to be solved to derive a unique segment or joint variable solution to achieve the desired tip pose. By "pose" is meant the planar or spatial position and orientation of the tip. For a planar device, the position may be an X, Y location, and the orientation may be about the Z axis. For a fully spatial device, the position may be an X, Y, Z location, with orientations being about the X, Y and Z axes.

Furthermore it is a common requirement for a robot during startup to move from its current undefined position to a known position. This process is often described as homing. With a basic leader-follower method the robot can only start in certain configurations. It would be advantageous to be able to take the current configuration as the homed position and not require the arm to move into a particular shape before commencing work.

It is known that techniques for non-redundant robots may not be generally applied to redundant mechanisms especially where mechanisms are highly redundant.

Therefore there is a need to define methods that go beyond existing leader-follower methods, including the ability for the device to move to a new position in which the motion of its different parts are not necessarily a copy of the previous motion of other parts.

SUMMARY OF THE INVENTION

According to the present invention, there is provided a method of controlling an elongate robotic arm, the arm having a plurality of articulated segments, an actuator associated with each segment for controlling the position of the segment, and a control system for operating the actuators in order to place the arm in a required position, the method comprising:
gathering data representing the position of the arm;
inputting data representing a required new position for at least one part of the arm;
calculating, from the data representing the position of the arm and the data representing the required new position for the part, data representing a required new position of the arm, in which the part is located at the required new position, and the remainder of the arm is located as close as possible to the data representing the previous position of the arm; and
operating the actuators to move the arm into the new position.

It has been found for example that the current shape of the arm can be used in conjunction with the desired tip position or pose to calculate a new shape for the complete arm. When the arm is advancing, the method may be carried out at frequent intervals, for example each time the arm has advanced a short distance, which may be shorter than the length of a segment. Therefore the tip following movement can be made more accurate than simple 'copying' of one segment shape to the next. The method of the invention is also more flexible than the prior art "copying" method, because for example it is possible for a part of the body of the arm to be moved to a new position away from the path if required.

The current position or shape may be defined by the segment variables. The data representing the current shape may also relate to a line, or tube, that represents the current location of or space occupied by the device. The line may be continuously curving or consist of discrete curves, particularly where the segments comprise a plurality of articulated links, and thus each adopt a curved shape. The line may be a series of discrete points, or an interpolation between these points. Data concerning the current shape of the arm may for example be known from previous control movements, or from direct measurement of the shape or location of the arm.

The method may therefore involve locating the tip of the device at the desired position as defined by the input, and then locating as much as possible of the remainder of the device on the line defined by the current point of the device. The position may comprise both the location and the orientation of the device or part thereof, known as "pose".

If the new tip pose is an advance of the previous tip pose then the device will be pulled forwards. If the new tip pose is lateral to the previous tip pose most of the device may remain stationary with only the tip segments moving.

One method for achieving this with devices that comprise rigid segments is to represent the position of the arm with data representing the position of a point on each segment, for instance at the joint axis or midway along the segment, interpolating a line between these points, and ensuring that, in the new position, as many of these points as possible lie on the line joining the points in the old position. It will be appreciated that if the tip pose increment is small compared with the segment length then it should be possible for many of these points to lie on or very close to the line.

Depending on the kinematics of the structure, it may be appropriate that, in the new shape, more than one point per segment is on the line or, in other cases, it may only be possible or appropriate to place a point or points per multiple segments on the line (e.g. two segments). Alternatively or in addition the new position may be calculated to ensure that the tangent to the point on the device in the new shape aligns with the tangent to the point on the line representing the previous shape (i.e. the points have the same orientation).

The relative importance of maintaining the desired position and maintaining the desired orientation will depend upon the device and the use to which it is being put.

If the end of each segment is to be placed in the path, then (unless the shape of the path over the length of the segment exactly matches the shape of the segment) there will be a mismatch between the orientation of (or tangent to) the path at that point, and the orientation of the end of the segment. This means that the next segment (either more distal or more proximal, depending upon whether the calculation is made from tip to base or base to tip) will be in the wrong orientation. Considering an arm with many segments this may have the effect that the arm has more or less total curvature than the path. This will mean that, according to some measures, the arm deviates more from the path. This may limit the reach of the arm, and the arm may appear to oscillate as it progresses which will greatly increase the loads seen by the actuators, akin to an engine hunting. If a camera is mounted on the end of the arm, small variations (a few degrees) in orientation have the effect that the camera oscillates. This is extremely disadvantageous if the desire is that the arm advances towards a specific object. Ideally the target should remain steady in the field of view. Smooth tip motion is thus extremely important.

According to another aspect of the invention, the new position is calculated such that a part of each pair of adjacent segments has substantially the same orientation as the path and is located as closely as possible to the path. Alternative calculations may be performed to obtain the new position in the optimum way, given the tolerances in a given situation.

Controlling pairs of segments as a unit addresses the problem described above. If the path is described as a series of points, each path point can include data relating to a frame that defines the position and orientation of the path at this point. A pair of segments will have enough degrees of freedom that, in the new position, the end of the second segment is near to (less than a few mm away) or exactly on a point on the path with the same orientation as the point. If the path is smooth then the motion of the arm and tip mounted camera will be smooth. There are a variety of methods of creating a smooth path, including driving the arm with a manually operated joystick or following a pre-planned path.

This method may also be carried out by treating three segments together, which gives even more freedom to match the position and orientation of the end of each triplet of segments. Whilst it is possible that the mathematics may be solved for a triplet of segments and higher, in practice a two segment scheme is efficient and is simpler.

Alternatively it may be appropriate to ensure that whole segment is as near to the line as possible, for instance by minimizing the sum of the distances or the sum of the square of the distances between a set of points on the device and a set of points on the line. It will be appreciated that a number of known numerical methods may be used to achieve this efficiently.

Such calculations may take joint angular and velocity and acceleration limits into account.

It may also be appropriate to store data relating to previous arm configurations, either as a vector of segment variables or as lines in order to create a library of date representing previous positions or shapes. In tip following applications, this may be done by storing the data representing each required new position of the arm to create a path. This may be used in order to retrace a particular path or to conduct some analysis off-line.

Furthermore rather than relying on the existing arm pose and additional information, the information required to specify a new pose may be held in a form separate to the robot. Alternatively, the new required positions may be obtained from data stored separately from the robot as a required path. An example of such data is a path that is created from user input or automatically from the environment either in real time using sensors or offline with prior knowledge of the environment. The broad concept of such a path is disclosed in US 2003/0229420 to Buckingham.

A path may be created with knowledge of the device that will follow the path. If a device has a certain ability to change direction then if the path includes tighter turns the device will not be able to follow the path. Therefore the path can be designed or created, possibly in real time, with the device in mind, or it may be modified, e.g. smoothed, so that the device may more easily follow the path.

A series of paths may be defined to a number of desired locations. Such paths may be defined in a way that thus can be followed by different devices. For instance the exact path that can be taken by a device carrying a particular tool may be different from that which can be taken by the same device trying to reach the same end location whilst carrying a different tool.

The path may be a tube of varying diameter so as substantially to represent the space occupied by the arm, or preferably a line made up of discrete points or one or more continuous functions.

The path may be designed to be rapidly searchable in order to be able to match control points on the device with points or interpolated points on the path. This can be achieved by indexing the path in terms of length along the path.

It is also possible that the path varies with time, for example where such a path description is robust in the event of a change in the structure of the device. If the tension in one of the control ropes to a segment is lost then if the tension in the remaining control ropes to the same segment is removed then this segment will be controlled by the control ropes passing through the segment to the adjacent distal segment. Effectively one segment is lost and one segment increases in length. The new device with new kinematic structure may then use the same path to continue operating or may be controlled to move as close as possible to the previous arm shape. This would not be possible with prior leader follower methods.

In order to improve certain performance measures an arm may be allowed to deviate more or less from the path. For example, if it is required to advance the arm quickly, it is possible to reduce the tolerance concerning how closely the arm shape should conform to its previous shape or follow the path. Furthermore, devices may have different abilities to turn corners.

Data defining the path may also include additional data associated with one or more points on the path, which concern actions of the device, e.g. to take a picture or to change temperature.

The path may comprise zones, where the behavior of the device or a section of the device in that zone may change. It will be appreciated that there may be transition zones and the zones may not be fixed positions along the path since the device may need to transition from one zone to another.

The purpose of such an arm may be to operate in open space with obstacles or may be to operate within a void beyond a cluttered space (or pipe) or to operate in a cluttered space. Therefore it will be appreciated that it may not be appropriate for the tip to be pulled too far from the shape of the device that was previously required to avoid an obstacle or limits of the device itself.

In such situations it may be appropriate to identify segments of the device which should not leave the line of the previous arm shape. Typically the most distal segments will move away from the previous arm shape whilst the more proximal segments will remain on or near the line of the previous arm shape.

Therefore in some embodiments, the method may use different algorithms at the same time to control the motion of different segments of the same device. As a further aspect of the present invention, segments of the arm may be operated in transition between different algorithms.

Furthermore it may be appropriate for the tip pose to remain stationary and for part of the body of the device to move to a new position. For instance, in a dynamically changing environment, the body of the device may need to move to avoid a collision. An example is beating heart surgery where the tool may need to remain stationary but the arm body move. A further example might be an arm carrying a cup of coffee which has to avoid collision with an additional arm or a person whilst ensuring the coffee does not spill.

This can be achieved by relating the input device for the data representing the new position to a part of the device other than the tip. The input device may thus define a new position for a mid point of the device.

Furthermore it may be appreciated that a number of input devices may be used to input desired tip poses at the same time as new mid-point poses.

Furthermore these input devices could be joysticks or spatial human interface devices interfaced to the control algorithm through a computer or could be devices attached to the arm itself.

In one embodiment one or more collars could be located at points along the arm which may include the tip. The collar may be in loose contact with the arm or not in contact with the arm, with the relative motion of the collar with respect to the arm being measured in order to define a desired new pose for the arm.

Furthermore sensors along the length of the arm rather than human input devices may be used in order to define new positions for parts of the arm, so as to enable an arm to have more autonomous behavior.

It will be appreciated that as a device advances it may be attached to a mechanism that advances the device. This may be a linear carriage and hence the line extension would ideally be defined by the line of the linear carriage. If the device advances along a curved rail or from a "hosereel", then the line extension may be defined accordingly. If the introduction mechanism is an industrial robot then the line may be any line in space that the robot may achieve. If the introduction device is a mobile robot or mobile platform, the line may be another shape defined so as to enable the mobile robot to avoid obstacles. It will be appreciated that this gives great flexibility for the introduction mechanism to retract an arm in a manner to avoid collisions or optimize performance.

The invention also comprises a robotic arm arranged to be operated according to the methods defined above.

In one advantageous embodiment a method of controlling the position of a robotic arm is provided where the arm has a plurality of articulated segments, an actuator associated with each segment for controlling the position of the segment, and a control system for operating the actuators in order to place the arm in a required position. The method comprises the steps of (a) gathering data representing the position of the arm and (b) inputting data representing a required new position of at least one part of the arm. The method further comprises the step of (c) calculating, from the data representing the position of the arm and the data representing the required new position of the one part, data representing a required new position of the arm, in which the one part is located at the required new position, and the remainder of the arm is substantially located at the previous position of the arm. Finally, the method comprises the step of (d) operating the actuators to move the arm into the new position.

In another advantageous embodiment a method of controlling the position of a robotic arm is provided where the arm has a plurality of articulated segments, an actuator associated with each segment for controlling the position of the segment, and a control system for operating the actuators in order to place the arm in a required position. The method comprises the step of providing data representing a required position of the arm, the data defining a path comprising a series of points, each point having a position and an orientation. The method further comprises the step of calculating a position in which the arm is to be placed, in which a single point on each segment or on each adjacent group of segments has substantially the same orientation as the path and is located as closely as possible to the position of the path. Finally, the method comprises the step of operating the actuators to move the arm into the position.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figures 1, 2:
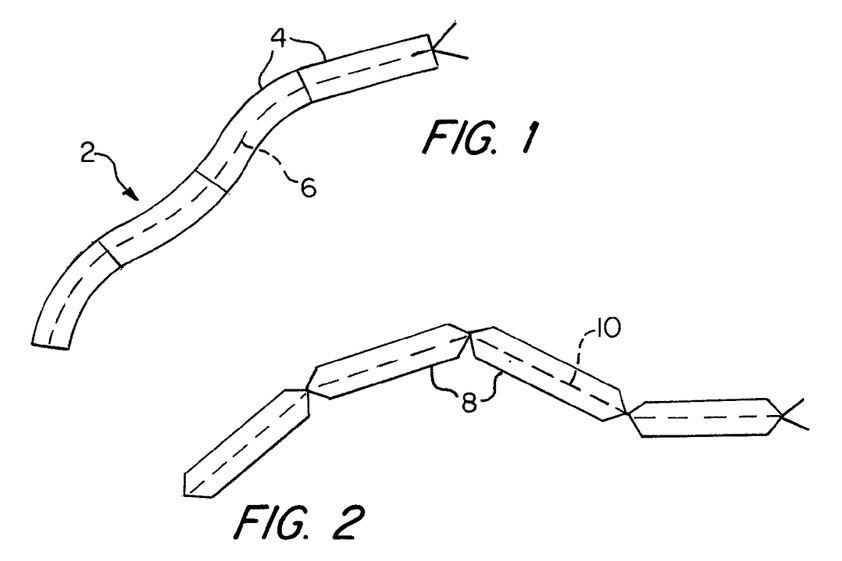
FIG. 1 is a schematic side view of a robotic arm for use with a method according to an advantageous embodiment of the invention.
FIG. 2 is a schematic side view of another robotic arm for use with a method according to another embodiment of the invention.

Referring to FIG. 1, a robotic arm 2 comprises a plurality of segments 4. The position of the arm may be represented by a line 6 located along the longitudinal axis of the arm 2. Where each segment 4 is flexible or comprises a plurality of articulated links, the line may be curved. Referring to FIG. 2, in the case where each segment 8 is rigid, the line 10 representing the shape comprises a series of straight lines.

Figures 3, 4:
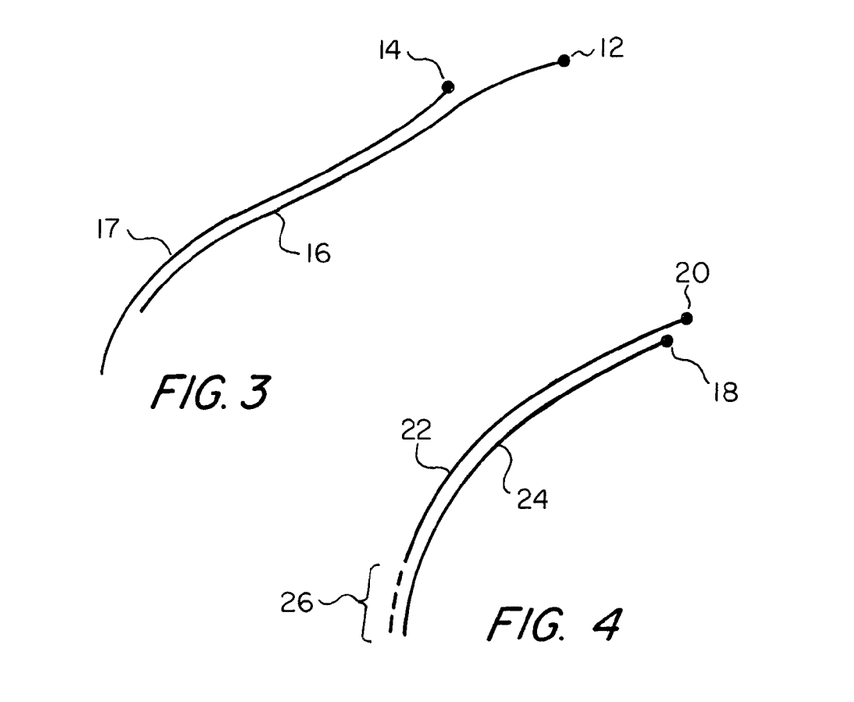
FIGS. 3 and 4 are diagrams of lines representing old and new positions of a robotic arm.

Referring to FIG. 3, it may be required to move the tip of the arm to a new advanced position or pose 12 from an original position 14. In this case, a new line 16 is calculated, in which the tip is located at the new position 14, and the remainder of the line 16 representing the new position is located as closely as possible to the old line 17.

In the case where the arm is retracting, the new tip position 18 is located behind the old tip position 20. The line 22 representing the old position is extrapolated back beyond the proximal end 26, and the new line position 24 is calculated to be as close as possible to the extended old line 22, 26.

Figure 5:
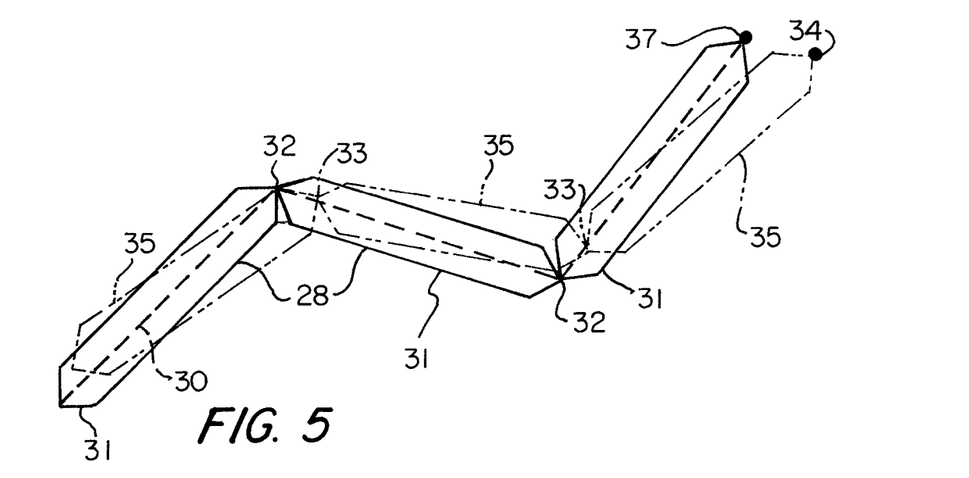
FIG. 5 is a schematic side view showing old and new arm positions according to one embodiment of the invention.

The method may be performed after the arm moves a small amount, less than the length of a segment, as shown in FIG. 5. Where the segments 28 are rigid, the line 30 representing the old position of the arm (segments 31) may be a series of straight lines joining the articulations 32 between each segment (shown in the figures as a broken line). Here it can be seen that, when the arm is advanced, a new line is calculated such that the articulation points 33 in the new position 35 of the segments are arranged to lie on the old line 30, with the tip having moved from the old position to the new position 34.

Figure 6:
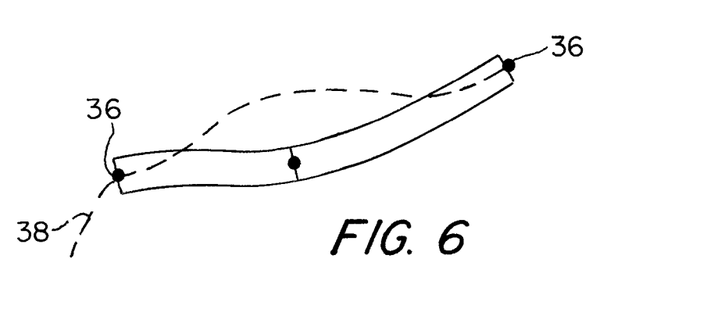
FIGS. 6, 7 and 8 are schematic side views showing new arm positions in relation to a line representing the old arm position.
Figure 7:
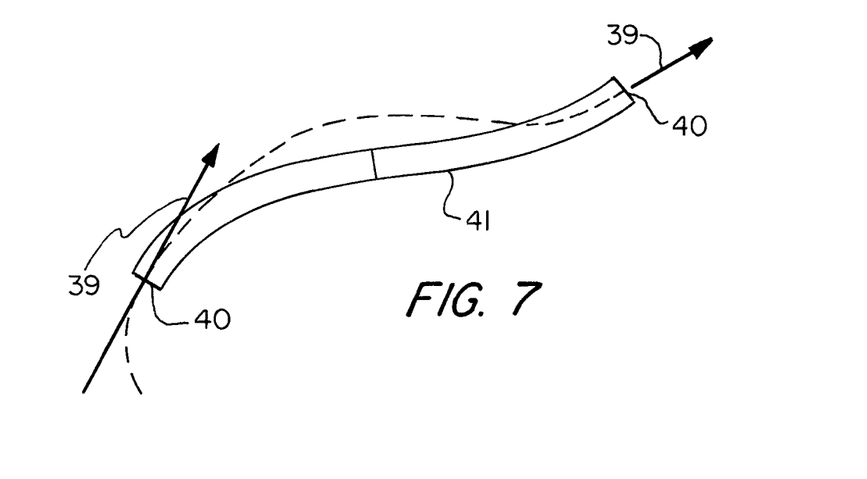

In another example, as shown in FIG. 6, alternate articulation points 36 may be arranged to lie on the line 39 representing to old arm position. As shown in FIG. 7, another possibility is to calculate a new position in which the tangents 39 to the axis of the arm at each or each alternate articulation 40 between segments are aligned in the old position (broken lines), and the new position of the arm 41.

Figure 8:
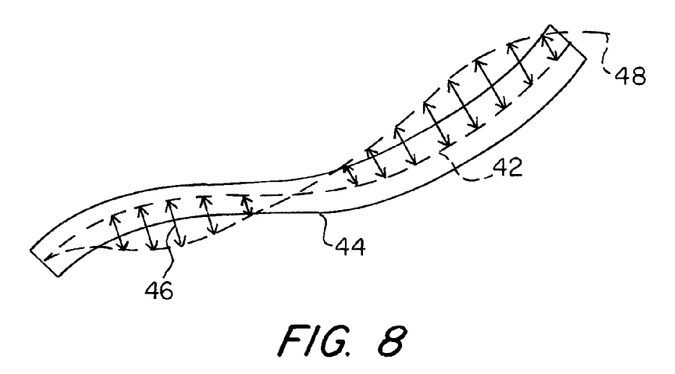

As shown in FIG. 8, one method of calculating a new line representing the new arm position to be located as close as possible to the previous position is illustrated. The new line 42 representing the position of the arm 44 is calculated such that the sum of the distances 46 between the new line 42 and old line 48 is as low as possible, measuring the distances 46 at various points along the line. An alternative method of calculating the position of the new line would be to ensure that the sum of the square of the distances between the sets of points is minimized.

Figure 9:
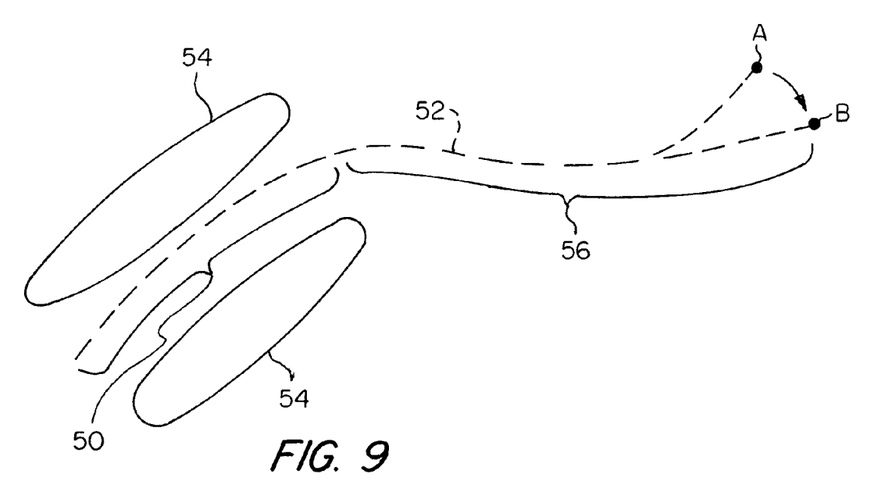
FIG. 9 is a diagram showing lines representing old and new arm positions.

In certain situations, it is more important or critical that a certain part of the arm 50 should remain stationary. This may be the case where the arm, the position of which is represented by the broken line 52, has passed between obstacles 54. Thus, when a new tip position B is required from an old position A, a distal section 56 of the arm may be allowed to move away from the old line 52, whilst retaining the proximal section 50 stationary. Thus the calculation may be performed such that, in the new position, some parts of the arm should remain closer to the previous position than other parts of the arm.

Figure 10:
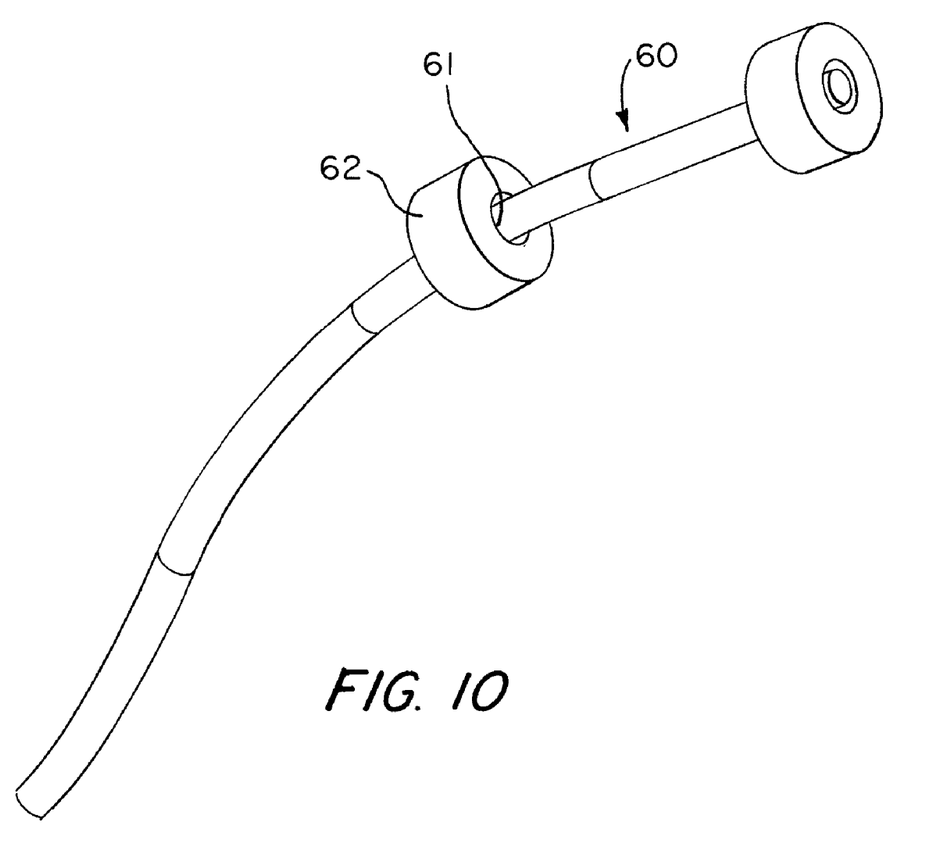
FIG. 10 is a perspective view of an arm for operating according to the invention.

FIG. 10 illustrates a means for inputting a new position for a part of the arm 60. The arm 60 is provided with one or more collars 62 which may be slidable along the arm 60. Each collar 62 may communicate with the arm control system, such that the arm 60 may be controlled to stay towards the centre of the collar 62. Thus if a user grasps the collar 62 and urges it to a new position, that part 61 of the arm adjacent the collar 62 may be moved to a new position within the collar 62.

Figure 11:
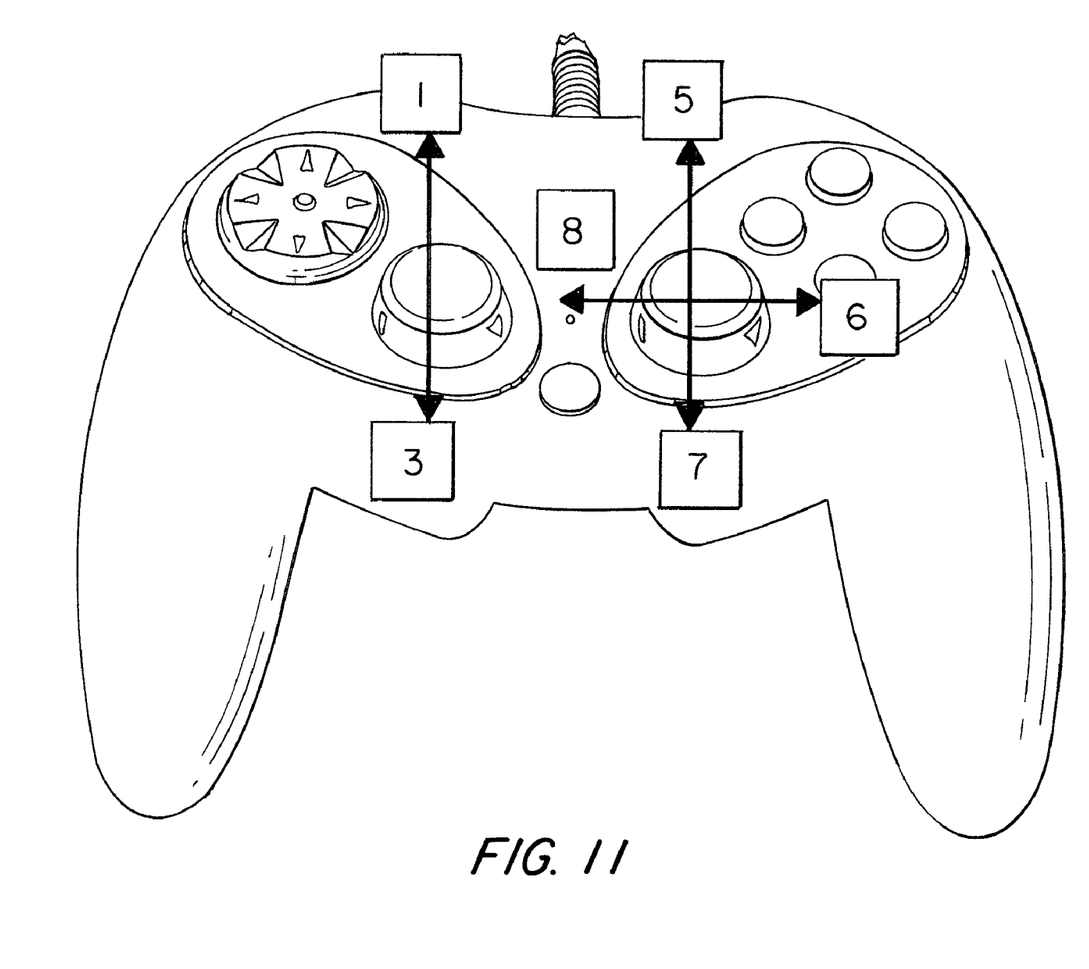
FIG. 11 is a perspective view of a manual controller for operating an arm in accordance with the invention.

It will be appreciated that the method of inputting the desired tip location is critical for the ease of use of such a device. A suitable device for inputting a required new position of a point along the arm is shown in FIG. 11.

It has been found that a twin analogue joystick control pad—as known and used for gaming—is well adapted to the purpose. The left hand joystick may be configured for advancing (e.g. press forward) and retracting (e.g. pull back) of the arm. Advancing in this context is continuing in the axial direction, or the direction of the longitudinal tip vector (often called the approach vector in robotics). Retracting will cause the device to retract along the retract line described above. If the right hand joystick is moved at the same time as the left hand joystick is used to advance the tip then desired advance vector will be up, down left or right (or in combination) of the pure advance vector.

It has been found that an additional input mode is to move the tip in the Cartesian frame attached to the tip—i.e. to translate in X or Y. Therefore as a further aspect of the present invention if the left hand joystick is not used then the right hand joystick will automatically define preferred Cartesian tip motion relative to the current tip pose.

Furthermore the user may prefer this automatic mode change to be between advancing and rotations about the Cartesian frame or advancing and motion of the tip segment in tip segment space. It will be appreciated that these may be preselected as the action or user selectable according to the operator need.

Figure 12:
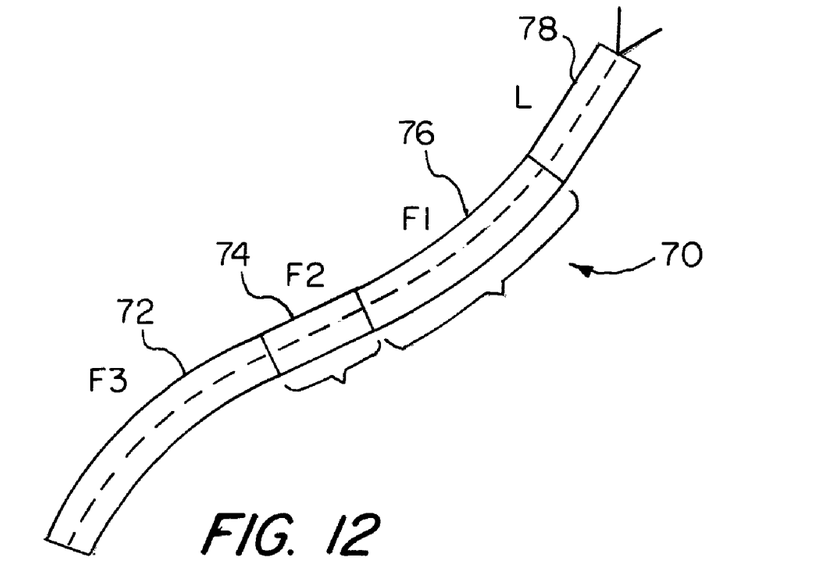
FIGS. 12 and 13 are schematic side views of an arm suitable for use with a method according to the invention.
Figure 13:
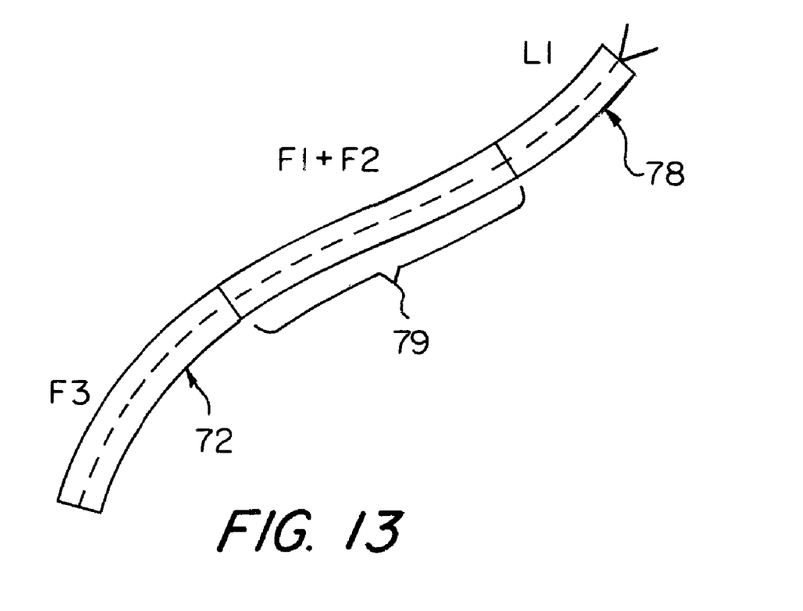

The method of the invention may be used for an arm 70 which has sections or segments e.g. 72, 74, 76, 78 of unequal lengths. With such an arm, it is not possible when advancing the arm simply to copy the shape of the lead segment to the following segment. However with the method of the invention, should the actuators to one of the segments 74 fail, the actuators for the adjacent distal segment 76 will effectively control the two adjacent segments 74, 76 together as one segment 79.

Figure 14:
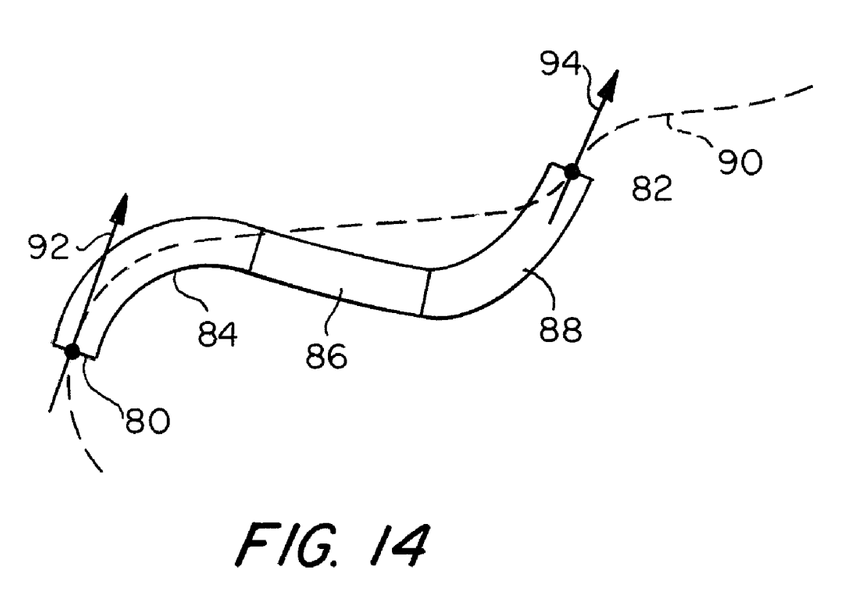
FIG. 14 is a schematic side view of an arm illustrating a method according to another embodiment of the invention.

Referring now to FIG. 14, as described above in relation to FIG. 6, it is possible to "fit" the arm to the path by fitting alternate articulation points to the line, matching either the position of or the tangent to the line, depending upon the priorities for the particular use to which the arm is being put. FIG. 14 shows an alternative method in which every third articulation point may be matched to the path or line. The ends 80, 82 of three adjacent segments 84, 86, 88, may be matched to the line 90. Taking three segments together, there are sufficient numbers of degrees of freedom such that the ends 80 and 82 may be placed exactly on the line 90 and with exactly the same orientation (shown by tangents 92, 94) to the line.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of controlling a robotic arm, the arm having a plurality of articulated segments, an actuator associated with each segment for controlling a position of the segment, and a control system for operating the actuators in order to place the arm in a required position, the method comprising:
  providing data representing a required position of the arm, the data defining a path comprising a series of points, each point having a position and an orientation;
  calculating a position in which the arm is to be placed, in which a single point on each pair of adjacent segments has substantially the same orientation as the path and is located as closely as possible to the position of the path, and
  operating the actuators to move the arm into the position.

2. A method according to claim 1, in which the plurality of segments comprises at least three adjacent segments.

3. A robotic arm arranged to be operated according to the method as claimed in claim 1.

4. A method according to claim 1, in which the data representing the required position of the arm is data representing a space occupied by the arm.

5. A method according to claim 1, in which the data representing the required position of the arm is data defining a line, or tube.

6. A method according to claim 5, in which the line is continuously curving, or comprises a plurality of discrete curves.

7. A method according to claim 5, in which the line is a series of discrete points, or an interpolation between such points.

8. A method according to claim 1, in which the data representing the required position of the arm is obtained by measuring a shape of the arm, or by analyzing previous actuator operation.

9. A method according to claim 1, in which different algorithms are used simultaneously to control different segments of the same device or where segments of the arm are operated in transition between different algorithms.

10. A method according to claim 1, in which the data representing the required position of the arm relates to a new position of a tip and also of a midpoint of the arm.

11. A method according to claim 1, in which the data is input using a manual input device interfaced to the control system through a computer, or attached to the arm itself.

12. A method according to claim 1, in which one or more collars are located at points along the arm, being no more than in loose contact with the arm, with a relative motion of the collar with respect to the arm being measured in order to define a desired new pose for the arm.

* * * * *